Inventors
Sven-Eric Hedström and Uno Lamm
By James Aiken Attorney.

Patented May 17, 1949

2,470,556

UNITED STATES PATENT OFFICE 2,470,556

RECTIFIER WITH A VOLTAGE REGULATING REACTOR SATURABLE BY DIRECT CURRENT

Sven-Eric Hedström, Ludvika, and Uno Lamm, Kopparberg, Sweden, assignors to Allmanna Svenska Elektriska Aktiebolaget, Vasteras, Sweden, a Swedish corporation Application November 14, 1946, Serial No. 709,850
In Sweden November 16, 1945

10 Claims. (Cl. 321—25)

An automatic voltage regulation of rectifiers by means of direct current saturable reactors offers, as is well known, the advantage that it can be constructed without any movable parts, such parts being subject to continuous wear and tear during operation and needing also repeated inspection for other reasons. Such a voltage regulation is sometimes combined with a current limiting device, which sets in instead of the voltage regulation, if the current for some reason should have tendency to rise above a permissible value, for instance in battery charging, if the battery should have been too heavily discharged for some reason. According to the present invention, it is not the current itself, but a time integral depending thereon, which determines when the ordinary regulation to constant voltage shall be replaced by a regulation to a lower voltage, which keeps the aforesaid time integral within permissible limits. The most important purpose of the current limitation has as a rule been to prevent an overloading and consequent overheating of the valve members of the rectifier, and especially the overheating requires a certain time integral of the current or of its square, respect being also paid to the heat being conducted off. In order to adapt the action of the regulator to this risk of overheating as exactly as possible, it is advisable that also the current limiting member consists of a thermic member. The manner of realizing this, which is theoretically most simple, is to cause the current limiting member to be directly influenced by the temperature of one of the valve discs of the rectifier, but in practice it is often more simple to construct the said member as a separate member traversed by the direct current or the alternating current or a current proportional thereto, said member directly or indirectly influencing the regulator.

Some forms of the invention are diagrammatically illustrated in Figs. 1-6 of the accompanying drawing.

Figure 1:
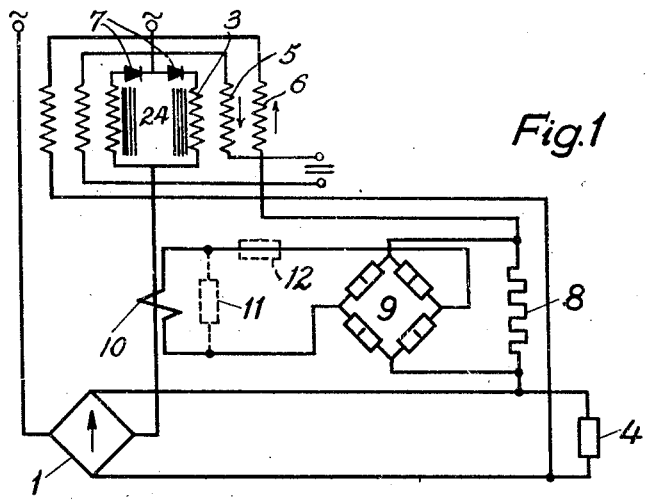

In Fig. 1, the numeral 1 designates the main rectifier, which is fed from a pair of alternating current terminals 2 across a direct current saturable reactor, and 4 is the direct current load, which for instance may consist of a storage battery with or without another load in parallel. The reactor has two external controlling windings 5, 6 and a self-magnetisation conventionally indicated by the arrow 7, in general preferably a so-called spare self-magnetisation. The winding 5, which acts in the same sense as the self-magnetisation, is fed by constant current from a source of current which is not shown, while the winding 6, which opposes the former one, is fed from the direct current voltage across a resistance 8. In this manner the reactor is made to regulate to constant voltage, as a lowering of the ampereturns of the winding 6 below the value of those of the winding 5 causes a reduction of the voltage drop in the reactor. In many cases, it is advisable to effect the comparison between the constant co-operating magnetisation and the opposite magnetisation proportional to the voltage in a separate auxiliary direct current saturable reactor, which controls the main reactor connected in series with the rectifier 1.

The alternating current winding 3 of said reactor is preferably, in a manner well-known per se, divided into two coils, each with a separate core 24. In series with each of these coils, there is connected a rectifying valve 7, the valves being so connected that one half of each alternating current wave traverses only the left hand coil 3 and the remaining halves the right hand coil 3 while a pulsating direct current identical with the alternating current circulates through the closed circuit formed by the two coils. Such a connection, which is also well-known per se, has been referred to above as a spare self-magnetisation as has been conventionally illustrated by the arrow 7. The two external controlling windings of the reactor are preferably also divided between the two cores 24 and are designated as 5 and 6 as in Figs. 1-5, in which they are conventionally represented only by heavy lines with arrows indicating their direction of magnetisation as compared with that of the self-magnetisation. In Fig. 7, their direction of magnetisation is indicated by arrows following the coils 5, 6.

For effecting a limitation of a time integral, depending on the heat action of the current, to a certain value, the resistance 8, which is supposed to be of ordinary type with a slightly positive temperature coefficient or possibly independent of the temperature, is connected in parallel to a square of resistance 9 having a strongly negative temperature coefficient. The resistance 8 is connected in a bridge between two opposite corners of the square, while between the two remaining corners is connected the secondary winding of a current transformer 10 connected in the main alternating current circuit. When the current in this transformer rises, the ohmic value of the resistances 9 sinks, and the reactor will therefore regulate to a lower voltage. If a resistance 11 with a positive temperature coefficient is connected in parallel to the current transformer 10 and a resistance 12 with a negative temperature coefficient is connected in series with the resistance square 9, the aforesaid action will be more distinct beginning from a certain value of the main current. The reason is that by this connection the voltage across the resistance 11, i. e. across the secondary terminals of the current transformer, will rise with the current. The thermo-negative resistances will therefore be subjected to a rising voltage, which from a certain limit makes the circuit through these resistances unstable, so that the current will grow rapidly. It has, however, to be observed that the resistances be so dimensioned as not to be overheated.

In Figs. 2 to 6 inclusive, the direct current saturable reactor 3' is shown conventionally.

Figure 2:
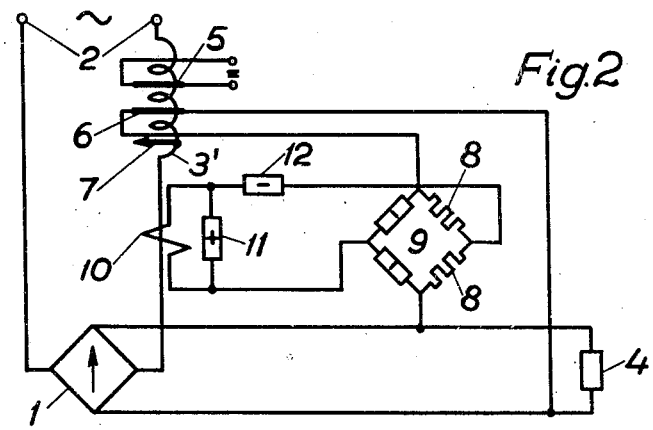

Such a risk of overheating is prevented by the connection according to Fig. 2, in which the resistance 8 is divided into two halves and incorporated into the resistance square 9 together with two thermo-negative resistances. In the circuit fed from the current transformer with a rising voltage, the constant and voltage-negative resistances here are connected in series, whence the former resistances limit the current through the latter ones. The members not specifically mentioned in connection with Fig. 2 are designated in the same manner as in Fig. 1.

Figure 3:
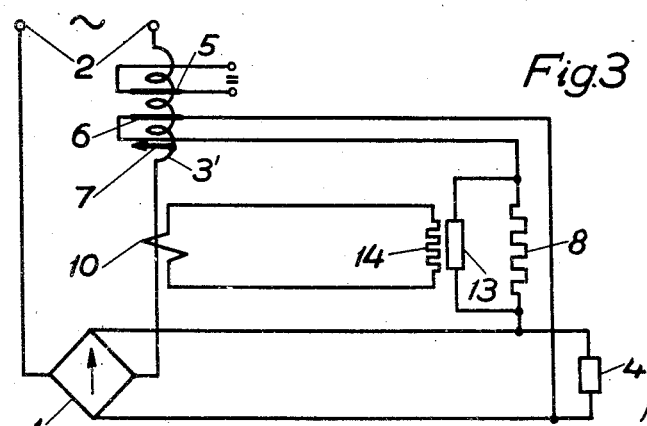

In Fig. 3, there is connected in parallel to the constant resistance 8 in the voltage responsive circuit a thermo-negative resistance 13, which is heated by a separate resistance 14 traversed by the main current or by a current proportional thereto. The resistance 14 may have a high temperature coefficient or it may consist of a part of the rectifier, for instance a valve disc. The details designated by the figures 1—7 in Fig. 3 correspond to Figs. 1 and 2. In this case the heating and the effects caused thereby will be essentially proportional to the square of the current, which is often valuable.

Figure 4:
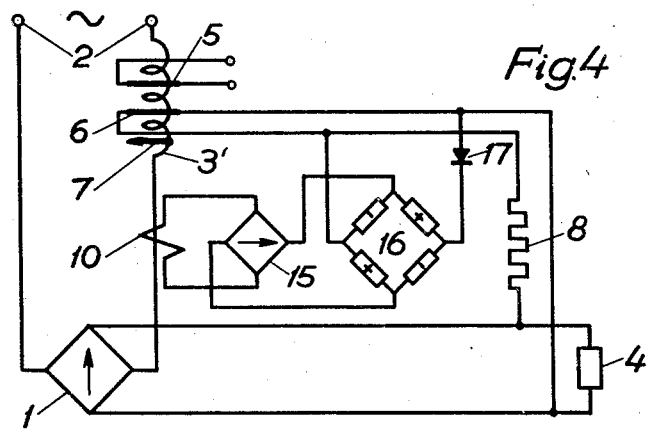

In Fig. 4, the figures 1—8 and 10 designate the same parts as in Fig. 1. The current transformer 10 here feeds a resistance square 16 through a rectifier 15, two opposite sides of the said square 16 consisting of thermo-positive and the two remaining ones of thermo-negative resistances. Normally the resistances are supposed to be so dimensioned that the right corner of the square has a higher potential than the left corner. A valve 17 normally prevents this potential difference from forcing any current through the coil 6 of the reactor 3'. When the current furnished by the current transformer 10 exceeds a certain value, the voltage between the right and left corners of the resistance square changes its direction and forces an additional current through the coil 6. It is also possible to provide a separate winding 19 on the reactor 3' according to Fig. 5, through which winding the current from the resistance square 16 is led, while the current from the voltage terminals across the resistance 8 passes alone through the winding 6. Otherwise, Fig. 5 contains the same members as Fig. 4, designated in the same manner. The action in both cases will be that the magnetizing action of the current flowing through the bridge conductor across the valve 17, when a certain current is exceeded in the main circuit, is added to the action of the voltage across the resistance 8. The current through the valve 17 may be caused to rise much more rapidly than the main current by an appropriate dimensioning of the resistances. The voltage is thus lowered and the current is limited to a moderate value.

Figure 5:
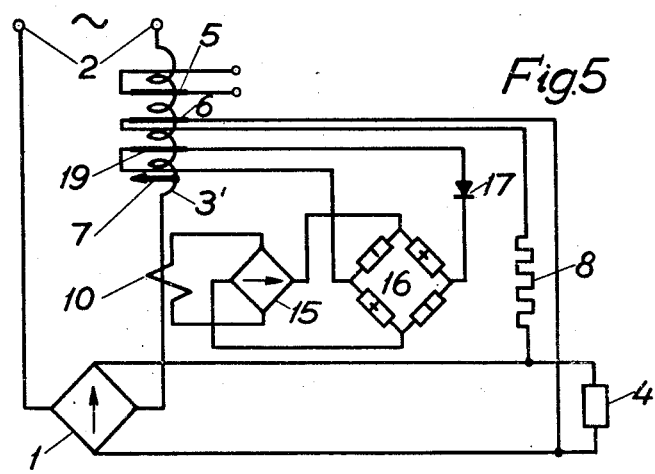
Figure 6:
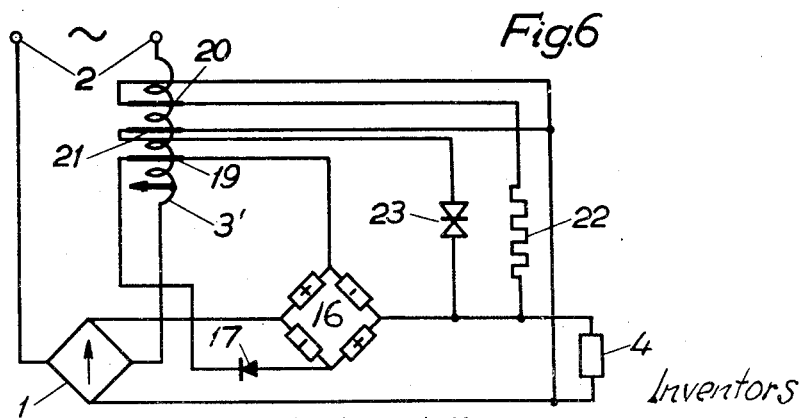

Fig. 6 shows two differences with respect to Fig. 5, which differences are independent of each other. First, the resistance square 16 is connected on the direct current side which is easy to accomplish when it feeds a separate winding 19 of the reactor 3' (across the valve 17). Hereby the current transformer 10 and the separate rectifier 15 in Fig. 5 can be spared. Secondly, the reactor 3' is of the type well-known per se, in which the comparison is not effected between a normal quantity and a quantity proportional to the regulated voltage, but between two windings 20, 21 opposing each other, said windings being both fed from the voltage, although across resistances which depend on the voltage in different ways. Thus the co-operating winding 20 is fed across a constant or positively voltage-dependent (growing at a rising voltage) resistance 22, while the opposing winding 21 is fed across a negatively voltage-dependent resistance 23. At a certain voltage these two windings give equal numbers of ampereturns (difference=0), which gives the same result as when the ampereturns of the two oppositely acting windings 5 and 6 in Fig. 5 become equal. The construction of the reactor 3' thus described is of course possible also in Figs. 1–4.

Also a resistance element indirectly heated by the load current (an analogy of the element 13 of Fig. 3) may be constructed as a resistance square analogous to the square 16 in Figs. 4–6, whereby the same discontinuous action is obtained in exceeding a certain current value.

We claim as our invention:

1. An electric rectifying and voltage regulating device comprising a rectifier, a direct current saturable reactor controlling the direct current voltage of said rectifier, saturating components opposing each other on said reactor acting to keep said direct current voltage normally constant, and means, actuated by a time integral of the direct current from said rectifier and acting to limit the said time integral to a permissible value.

2. An electric rectifying and voltage regulating device comprising a rectifier, a direct current saturable reactor controlling the direct current voltage of said rectifier, saturating components opposing each other on said reactor acting to keep said direct current voltage normally constant, and thermic means actuated by the direct current from said rectifier and acting to limit a time integral of said current to a permissible value.

3. An electric rectifying and voltage regulating device comprising a rectifier, a direct current saturable reactor controlling the direct current voltage of said rectifier, saturating components opposing each other on said reactor acting to keep said direct current voltage normally constant, and resistances, having a negative temperature coefficient and traversed by the load current of said rectifier, affecting a saturating component of said reactor.

4. An electric rectifying and voltage regulating device comprising a rectifier, a direct current saturable reactor controlling the direct current voltage of said rectifier, saturating components opposing each other on said reactor acting to keep said direct current voltage normally constant, and resistances, having a negative temperature coefficient and traversed by a current varying with the load current of said rectifier, affecting a saturating component of said reactor.

5. An electric rectifying and voltage regulating device comprising a rectifier, a direct current saturable reactor controlling the direct current voltage of said rectifier, saturating components opposing each other on said reactor acting to keep said direct current voltage normally constant, and a resistance, having a negative temperature coefficient and indirectly heated by the load current of said rectifier, affecting a saturating component of said reactor.

6. An electric rectifying and voltage regulating device comprising a rectifier, a direct current saturable reactor controlling the direct current voltage of said rectifier, saturating components opposing each other on said reactor acting to keep said direct current voltage normally constant, and resistances traversed by a current varying with the load current of said rectifier, connected in the circuit of a saturating component of said reactor.

7. An electric rectifying and voltage regulating device comprising a rectifier, a direct current saturable reactor controlling the direct current voltage of said rectifier, saturating components opposing each other on said reactor acting to keep said direct current voltage normally constant, a square of thermo-negative resistances fed by a current varying with the load current across a diagonal, and a constant resistance included in a voltage responsive circuit feeding a saturating winding of said reactor connected across the other diagonal of said resistance square.

8. An electric rectifying and voltage regulating device comprising a rectifier, a direct current saturable reactor controlling the direct current voltage of said rectifier, saturating components opposing each other on said reactor acting to keep said direct current voltage normally constant, a square having thermo-negative resistances in two adjacent sides and resistances of other type in the two other sides, means for feeding a current varying with the load across the diagonal of said square connecting the point between said thermo-negative resistances to the point between said other resistances, said other diagonal in the resistance square being included in the circuit of a voltage-responsive saturating component of said reactor.

9. An electric rectifying and voltage regulating device comprising a rectifier, a direct current saturable reactor controlling the direct current voltage of said rectifier, saturating components opposing each other on said reactor acting to keep said direct current voltage normally constant, a square of resistances, including thermo-negative ones, a substantially constant resistance connected in parallel with a diagonal of said resistance square, means for feeding a current varying with the load current through said resistance and diagonal in parallel, and a voltage responsive circuit feeding a saturating winding of said reactor across the other diagonal of said resistance square.

10. An electric rectifying and voltage regulating device comprising a rectifier, a direct current saturable reactor controlling the direct current voltage of said rectifier, saturating components opposing each other on said reactor acting to keep said direct current voltage normally constant, a square of thermo-negative and other resistances fed by a current varying with the load current and dimensioned to give normally a voltage of one direction across a diagonal but a voltage of the opposite direction when a certain temperature is exceeded, a voltage responsive circuit acting to saturate said reactance in one direction, means for normally blocking the voltage of said diagonal but permitting it to cooperate with said voltage responsive circuit when changing its direction.

SVEN-ERIC HEDSTRÖM.
UNO LAMM.

REFERENCES CITED

The following references are of record in the file of this patent:

UNITED STATES PATENTS

| Number | Name | Date |
| --- | --- | --- |
| 1,865,562 | Gilson | July 5, 1932 |
| 1,959,513 | Weyandt | May 22, 1934 |
| 2,316,331 | Hedding | Apr. 13, 1943 |
| 2,413,033 | Potter | Dec. 24, 1946 |